United States Patent
Yoon et al.

(10) Patent No.: US 8,676,028 B2
(45) Date of Patent: *Mar. 18, 2014

(54) METHOD FOR REPRODUCING DATA RECORDED ON AN INTERACTIVE RECORDING MEDIUM IN CONJUNCTION WITH ASSOCIATED AUXILIARY DATA

(75) Inventors: Woo Seong Yoon, Namyangjoo-si (KR); Jea Yong Yoo, Seoul (KR); Tae Ho Kim, Seoul (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 523 days.

This patent is subject to a terminal disclaimer.

(21) Appl. No.: 12/693,102

(22) Filed: Jan. 25, 2010

(65) Prior Publication Data

US 2010/0129061 A1 May 27, 2010

Related U.S. Application Data

(63) Continuation of application No. 11/613,042, filed on Dec. 19, 2006, which is a continuation of application No. 10/729,558, filed on Dec. 4, 2003, now Pat. No. 7,610,359.

(30) Foreign Application Priority Data

Dec. 7, 2002 (KR) .................. 10-2002-0077595

(51) Int. Cl.
*H04N 5/94* (2006.01)

(52) U.S. Cl.
USPC .......................... 386/239; 386/248

(58) Field of Classification Search
None
See application file for complete search history.

(56) References Cited

U.S. PATENT DOCUMENTS

| | | |
|---|---|---|
| 5,687,160 A | 11/1997 | Aotake |
| 5,808,662 A | 9/1998 | Kinney |
| 5,815,194 A | 9/1998 | Ueda |
| 5,909,551 A | 6/1999 | Tahara |
| 5,929,857 A | 7/1999 | Dinallo |
| 5,987,525 A | 11/1999 | Roberts |
| 5,995,091 A | 11/1999 | Near |
| 6,061,680 A | 5/2000 | Scherf |
| 6,130,988 A | 10/2000 | Jeong |

(Continued)

FOREIGN PATENT DOCUMENTS

| | | |
|---|---|---|
| EP | 0 737 009 | 10/1996 |
| EP | 0 762 422 | 3/1997 |

(Continued)

OTHER PUBLICATIONS

Chinese Office Action dated Aug. 31, 2007, for Application No. 200380100281.8, 11 pages.

(Continued)

*Primary Examiner* — Huy T Nguyen
*Assistant Examiner* — Eileen Adams
(74) *Attorney, Agent, or Firm* — Fish & Richardson P.C.

(57) ABSTRACT

A method for reproducing data recorded on an interactive recording medium in conjunction with associated auxiliary data is disclosed. An interactive recording medium reproducing apparatus reproduces A/V data recorded on an interactive recording medium such as an interactive DVD in conjunction with contents data provided by a contents providing server using navigation information for the contents data also provided by the contents providing server, thereby allowing synchronized reproduction of data from different sources.

6 Claims, 3 Drawing Sheets

(56) References Cited

U.S. PATENT DOCUMENTS

| | | | |
|---|---|---|---|
| 6,138,175 A | 10/2000 | deCarmo | |
| 6,161,132 A | 12/2000 | Roberts | |
| 6,162,132 A | 12/2000 | Yoneyama | |
| 6,230,207 B1 | 5/2001 | Roberts | |
| 6,240,459 B1 | 5/2001 | Roberts | |
| 6,564,255 B1 | 5/2003 | Mobini | |
| 6,580,870 B1 | 6/2003 | Kanazawa et al. | |
| 6,654,769 B2 | 11/2003 | Ito | |
| 6,735,152 B2 | 5/2004 | Sato | |
| 6,788,653 B1 | 9/2004 | Sakamoto et al. | |
| 6,836,273 B1 | 12/2004 | Kadono | |
| 6,907,616 B2 | 6/2005 | Yamauchi et al. | |
| 6,957,387 B2 | 10/2005 | Barbieri | |
| 7,017,175 B2 | 3/2006 | Alao | |
| 7,127,736 B2 | 10/2006 | Kondo | |
| 7,188,193 B1 | 3/2007 | Getsin | |
| 7,197,234 B1 | 3/2007 | Chatterton | |
| 7,216,149 B1 | 5/2007 | Briscoe et al. | |
| 7,274,740 B2 | 9/2007 | Van Beek | |
| 7,313,809 B1 | 12/2007 | Mohan | |
| 7,376,333 B2 | 5/2008 | Chung | |
| 7,379,661 B2 | 5/2008 | Lamkin et al. | |
| 7,392,481 B2 | 6/2008 | Gewickey | |
| 7,409,111 B2 | 8/2008 | Sakimura | |
| 7,448,021 B1 | 11/2008 | Lamkin | |
| 7,451,453 B1 | 11/2008 | Evans | |
| 7,466,904 B2 | 12/2008 | Yoo | |
| 7,503,051 B1 | 3/2009 | Ueda et al. | |
| 7,610,359 B2 | 10/2009 | Yoon et al. | |
| 7,715,694 B2 * | 5/2010 | Yoon et al. | 386/248 |
| 7,778,523 B2 * | 8/2010 | Yoon et al. | 386/248 |
| 2001/0056580 A1 | 12/2001 | Seo | |
| 2002/0037159 A1 | 3/2002 | Goto | |
| 2002/0049981 A1 | 4/2002 | Tzou | |
| 2002/0057286 A1 | 5/2002 | Markel et al. | |
| 2002/0078144 A1 * | 6/2002 | Lamkin et al. | 709/203 |
| 2002/0080753 A1 | 6/2002 | Lee | |
| 2002/0087621 A1 | 7/2002 | Hendriks | |
| 2002/0103855 A1 | 8/2002 | Chatani | |
| 2002/0106193 A1 | 8/2002 | Park | |
| 2002/0112247 A1 | 8/2002 | Horner | |
| 2002/0122658 A1 | 9/2002 | Fukuda | |
| 2002/0147827 A1 | 10/2002 | Breiter | |
| 2002/0152286 A1 | 10/2002 | Peddu | |
| 2002/0162120 A1 | 10/2002 | Mitchell | |
| 2002/0178276 A1 | 11/2002 | McCartney et al. | |
| 2003/0016943 A1 | 1/2003 | Chung | |
| 2003/0028892 A1 | 2/2003 | Gewickey | |
| 2003/0039187 A1 | 2/2003 | Geutskens | |
| 2003/0093816 A1 | 5/2003 | Chung et al. | |
| 2003/0113095 A1 * | 6/2003 | Fujinami | 386/46 |
| 2003/0161615 A1 | 8/2003 | Tsumagari | |
| 2003/0202773 A1 * | 10/2003 | Dow et al. | 386/46 |
| 2003/0229679 A1 | 12/2003 | Yoo | |
| 2004/0057699 A1 | 3/2004 | Kim | |
| 2004/0096199 A1 | 5/2004 | Chou | |
| 2004/0133661 A1 | 7/2004 | Yoon | |
| 2004/0247294 A1 | 12/2004 | Jung | |
| 2005/0081699 A1 | 4/2005 | Becker | |
| 2005/0118417 A1 | 6/2005 | Min | |
| 2005/0210505 A1 | 9/2005 | Chiu | |
| 2006/0031188 A1 | 2/2006 | Lara | |
| 2006/0117344 A1 | 6/2006 | Lamkin | |
| 2006/0143268 A1 | 6/2006 | Chatani | |
| 2006/0242161 A1 | 10/2006 | Kate | |
| 2007/0122117 A1 | 5/2007 | Kimura | |
| 2008/0131093 A1 | 6/2008 | Mohan | |
| 2008/0177863 A1 | 7/2008 | Mohan | |

FOREIGN PATENT DOCUMENTS

| | | |
|---|---|---|
| EP | 1 003 304 | 5/2000 |
| EP | 1 193 712 | 4/2002 |
| EP | 1 229 542 | 8/2002 |
| EP | 1 357 749 | 10/2003 |
| JP | 06-141252 | 5/1995 |
| JP | 08102940 A | 4/1996 |
| JP | 08-223556 | 8/1996 |
| JP | 08-336104 | 12/1996 |
| JP | 09-128408 | 5/1997 |
| JP | 10-136314 | 5/1998 |
| JP | 11-098467 | 4/1999 |
| JP | 11-161663 | 6/1999 |
| JP | 11-271071 | 10/1999 |
| JP | 2000-032429 | 1/2000 |
| JP | 2000-099758 | 4/2000 |
| JP | 2000-295578 | 10/2000 |
| JP | 2001-223987 | 8/2001 |
| JP | 2001285860 A | 10/2001 |
| JP | 2001-313930 | 11/2001 |
| JP | 2002-023719 | 1/2002 |
| JP | 2005-501363 | 1/2005 |
| JP | 2005-501364 | 1/2005 |
| JP | 2005-506785 | 3/2005 |
| KR | 10-0195106 | 6/1999 |
| KR | 2000-0030073 | 6/2000 |
| KR | 10-2002-0059706 | 7/2002 |
| KR | 10-2004-0049740 | 6/2004 |
| WO | WO 99/59290 | 11/1999 |
| WO | WO 00/63915 | 10/2000 |
| WO | WO 02/21529 | 3/2002 |
| WO | WO 02/50744 | 6/2002 |
| WO | WO 02/063878 | 8/2002 |
| WO | WO 03/019549 | 3/2003 |
| WO | WO 03/019557 | 3/2003 |
| WO | WO 2004/036575 | 4/2004 |
| WO | WO 2004/036576 | 4/2004 |
| WO | WO 2004/051644 | 6/2004 |

OTHER PUBLICATIONS

European Search Report dated Sep. 12, 2008, for Application No. 03754279.2, 3 pages.
European Search Report dated Oct. 17, 2007 for Application No. 07017018.8-2223, 7 pages.
European Search Report dated Oct. 17, 2007 for Application No. 03812704.9-2223, 3 pages.
International Search Report dated Feb. 20, 2004 for Application No. PCT/KR2003/002257, 1 page.
International Search Report dated Feb. 20, 2004 for Application No. PCT/KR2003/002383, 1 page.
Japanese Office Action dated Dec. 28, 2007 for Application No. 2004-558505, 4 pages.
Japanese Office Action dated Dec. 28, 2007 for Application No. 2004-558505 (with English Translation), 13 pages.
Japanese Office Action dated Oct. 17, 2008 for Application No. 2004-558505 (with English Translation), 13 pages.
Japanese Office Action dated Jun. 5, 2009 for Application No. 2004-558507, in English translation, 5 pages.
Japanese Patent Office dated Nov. 20, 2009 for Application No. JP2004-558507, (with English Translation), 9 pages.
Korean Office Action dated Feb. 29, 2008 for Application No. 10-2006-0137568, 3 pages.
Korean Office Action dated Feb. 29, 2008 for Application No. 10-2006-0137568 (with English Translation), 10 pages.
Korean Notice of Allowance dated Feb. 13, 2009 for Application No. 10-2006-0137568, 2 pages.
Korean Office Action dated Jan. 15, 2009 for Application No. 10-2002-0078023 (with English Translation), 12 pages.
Korean Office Action dated Jan. 20, 2009 for Application No. 10-2002-0077595 (with English Translation), 12 pages.
H. Mimura, *DVD-Video Format*, COMPCON '97 Proceedings, IEEE San Jose, CA USA, Feb. 23-26, 1997, Los Alamitos, CA, USA, IEEE Comput. Soc. US, Feb. 23, 1997, pp. 291-294.
U.S. Office Action dated Jul. 17, 2007 for U.S. Appl. No. 10/729,558, 10 pages.
U.S. Notice of Allowance dated Jun. 10, 2008 for U.S. Appl. No. 10/729,558, 6 pages.
U.S. Notice of Allowance dated Oct. 7, 2008 for U.S. Appl. No. 10/729,558, 10 pages.

(56) References Cited

OTHER PUBLICATIONS

U.S. Office Action dated Dec. 9, 2009 for U.S. Appl. No. 12/534,334, 8 pages.
U.S. Office Action dated Apr. 16, 2009 for U.S. Appl. No. 10/729,083, 8 pages.
Japanese Office Action (with English translation) dated Jan. 8, 2010 for Application No. 2004-558505, 6 pages.
U.S. Office Action dated Jan. 17, 2012 for U.S. Appl. No. 11/613,042, 20 pages.
U.S. Office Action dated May 4, 2012 for the U.S. Appl. No. 11/613,042, 27 pages.
Office Action for U.S. Appl. No. 10/729,558 dated Jan. 23, 2009, 13 pages.
Notice of Allowance for U.S. Appl. No. 10/729,558 dated Jun. 29, 2009, 20 pages.
Notice of Allowance for U.S. Appl. No. 10/729,558 dated Sep. 8, 2009, 11 pages.
Office Action for U.S. Appl. No. 10/729,083 dated Nov. 30, 2009, 12 pages.
Office Action for U.S. Appl. No. 10/729,083 dated May 13, 2010, 11 pages.
Office Action for U.S. Appl. No. 12/430,937 dated Aug. 5, 2010, 18 pages.
Notice of Allowance for U.S. Appl. No. 12/534,334 mailed Mar. 3, 2010 (6 pages).
Office Action for U.S. Appl. No. 12/511,591 mailed Dec. 16, 2009 (16 pages).
Notice of Allowance for U.S. Appl. No. 12/511,591 mailed May 11, 2010 (8 pages).
U.S. Office Action dated Aug. 13, 2012 for the U.S. Appl. No. 12/693,008, 13 pages.
U.S. Office Action dated Aug. 15, 2012 for the U.S. Appl. No. 12/693,061, 39 pages.
U.S. Office Action dated Sep. 13, 2012 for U.S. Appl. No. 12/693,131, 26 pages.
U.S. Notice of Allowance dated Jun. 7, 2012 for U.S. Appl. No. 12/430,937, 9 pages.
U.S. Office Action dated Jan. 7, 2013 for U.S. Appl. No. 12/693,008. 9 pages.
U.S. Office Action dated Jan. 7, 2013 for U.S. Appl. No. 12/693,061, 13 pages.

* cited by examiner

METHOD FOR REPRODUCING DATA RECORDED ON AN INTERACTIVE RECORDING MEDIUM IN CONJUNCTION WITH ASSOCIATED AUXILIARY DATA

CROSS-REFERENCE TO RELATED APPLICATIONS

This application is a continuation of U.S. application Ser. No. 11/613,042, filed Dec. 19, 2006, now pending, which is a continuation of U.S. application Ser. No. 10/729,558, filed Dec. 4, 2003, now U.S. Pat. No. 7,610,359, which claims the benefit of a foreign priority application filed in Korea as Serial No. 10-2002-0077595 on Dec. 7, 2002, all of which are incorporated by reference.

BACKGROUND OF THE INVENTION

1. Field of the Invention

The present invention relates to a method for reproducing A/V data recorded on an interactive recording medium in conjunction with contents data recorded thereon or contents data provided by a contents providing server connected through the Internet.

2. Description of the Related Art

High-density optical disks capable of recording large amounts of data are being widely used. The Digital Versatile Disc (DVD), which is a recording medium that is capable of recording large amounts of high-quality video data as well as digital audio data, is one example of these high-density optical disks.

The DVD includes a navigation data recording area in which navigation data required for playback control of A/V data is recorded and a data stream recording area in which digital data streams are recorded.

When a DVD is loaded into a DVD reproducing apparatus, the DVD reproducing apparatus first reads the navigation data recorded in the navigation data recording area and stores the navigation data in an internal memory. The DVD reproducing apparatus then begins reproduction of the DVD using the stored navigation data, thereby providing various functions of the DVD to a viewer.

The development of new interactive DVDs. is being progressing rapidly. Unlike the DVD, the interactive DVD (I-DVD) contains additional contents data, which is detailed information about A/V data recorded thereon and provides the contents data through a user interface. The contents data may be recorded on the I-DVD as html files.

In addition, a method for obtaining additional contents data from a contents providing server connected through the Internet while reproducing A/V data and contents data recorded on the I-DVD is under discussion. However, a method for effectively managing reproduction of A/V data and contents data responsive to a viewer's request is not yet available.

SUMMARY OF THE INVENTION

It is an object of the present invention to provide a method for reproducing data recorded on an interactive recording medium in conjunction with contents data provided by a contents providing server using navigation information for the contents data also provided by the contents providing server.

The method for reproducing A/V data recorded on an interactive recording medium in accordance with the present invention comprises the steps of (a) receiving playback control information for the A/V data from a contents providing server and storing the received playback control information and (b) presenting the A/V data reproduced from the interactive recording medium in conjunction with additional contents data received from the contents providing server using the stored playback control information.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
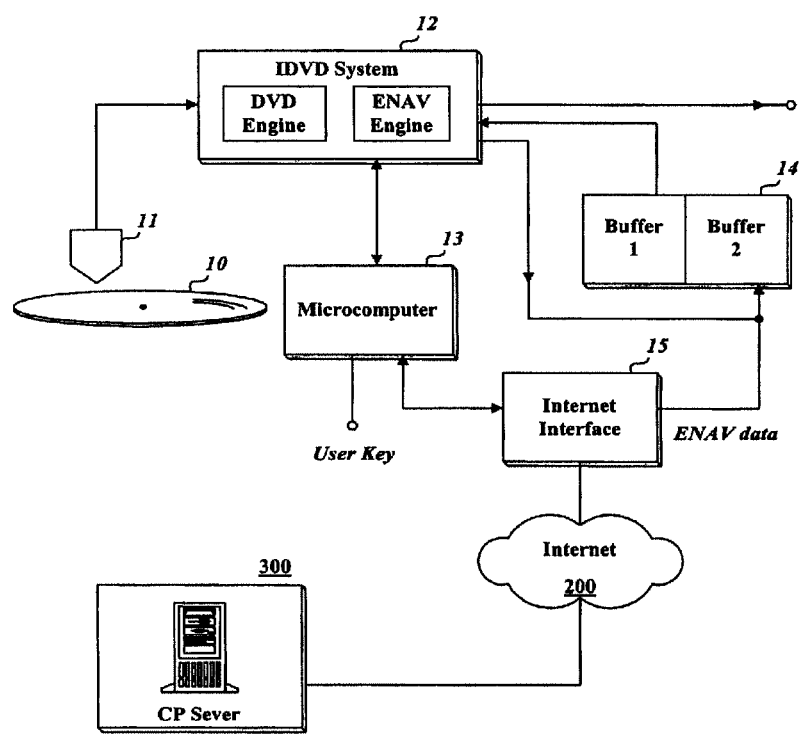
FIG. 1 illustrates an interactive optical disk reproducing apparatus in which the present invention may be advantageously embodied.

FIG. 1 illustrates an interactive optical disk reproducing apparatus in which the present invention may be advantageously embodied. The reproducing apparatus 100 comprises an optical pickup 11, an IDVD system 12, a microcomputer 13, a buffer memory 14, and an Internet interface 15 through which the apparatus 100 is connected to a contents providing server 300.

The IDVD system 12 includes a DVD engine for reproducing A/V data recorded on an I-DVD 10 and an enhanced navigation (ENAV) engine for reproducing contents data provided by the contents providing server 300 or contents data recorded on the I-DVD 10.

The IDVD system 12 outputs the contents data in synchronization with the A/V data from the IDVD 10. As shown in FIG. 1, the reproducing apparatus 100 is connected to the contents providing server 300 through the Internet interface 15 by the mutual operations of the microcomputer 13 and the ENAV engine included in the IDVD system 12.

ENAV contents data, which is additional contents data associated with the A/V data being reproduced from the I-DVD 10, is downloaded from the contents providing server 300 and then temporarily stored in the buffer memory 14. The buffer memory 14 can be logically divided into a first buffer (buffer 1) and a second buffer (buffer 2).

The ENAV engine in the IDVD system 12 outputs the A/V data from the I-DVD 10 in synchronization with the ENAV contents data from the I-DVD 10 or outputs the A/V data from the I-DVD 10 in synchronization with the ENAV contents downloaded from the contents providing server 300.

The contents providing server 300 provides various ENAV contents data associated with the A/V data recorded on the I-DVD 10 as a plurality of data files and provides ENAV navigation information for synchronizing the A/V data with the data files. The navigation information may be provided all at once or may be divided into a plurality of pieces and provided one by one when needed.

Figure 2:
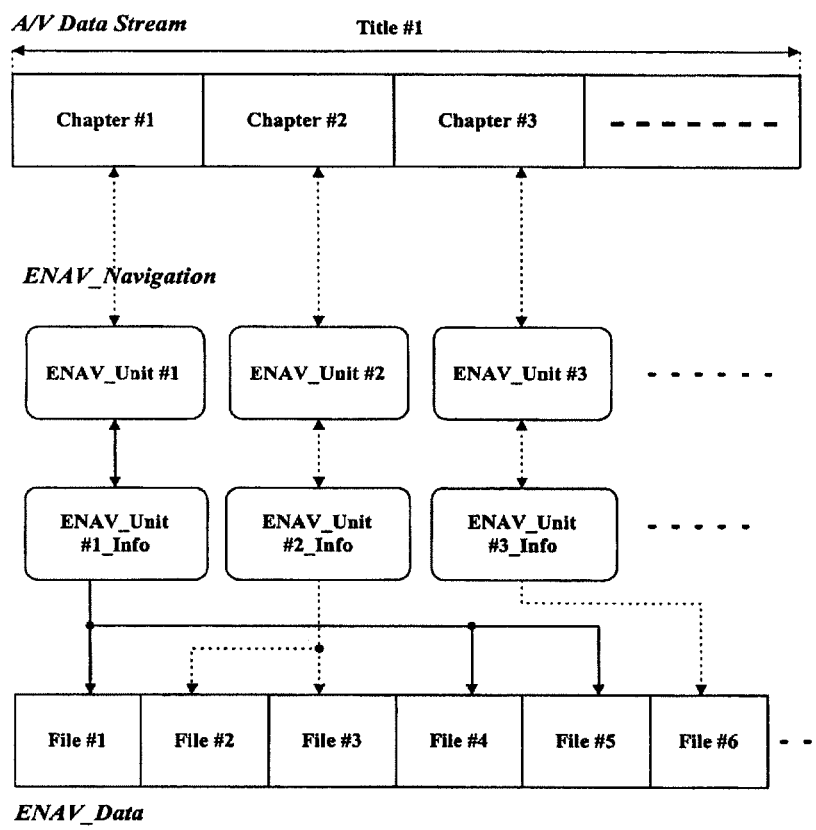
FIG. 2 illustrates the relationship among an A/V data stream, contents navigation information, and contents data files in accordance with the present invention.

As shown in FIG. 2, for example, a title of the I-DVD 10 is organized into individual chapters (Chapter#1, Chapter

2, ... ) and one or more data files (File#1, File#2, ... ) corresponding to each of the chapters are organized as an ENAV unit. Navigation information for anaging the data files included in the ENAV unit is provided as ENAV unit information (ENAV_Unit_Info).

The multiple pieces of ENAV unit information (ENAV_Unit#1_Info, ENAV_Unit#2_Info, ... ) are defined as a linked list and transmitted along with the ENAV contents data files or transmitted before the ENAV contents data files are sent.

Figure 3:
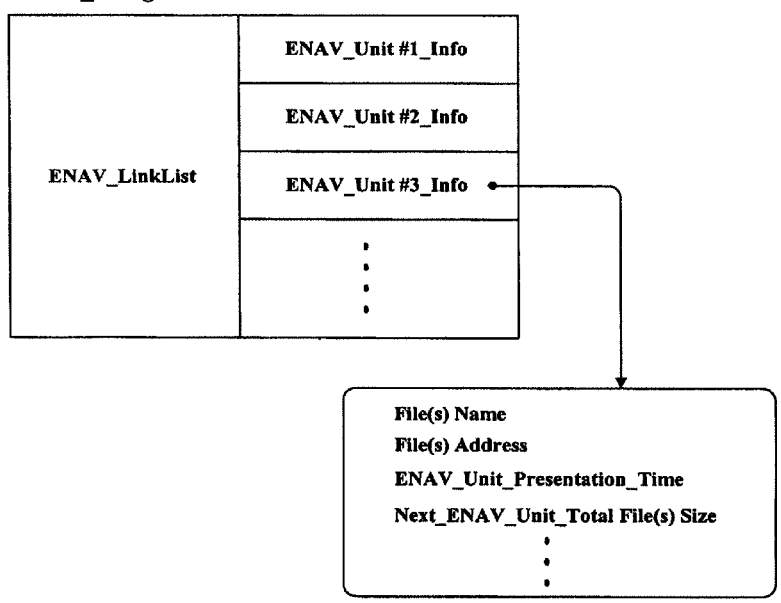
FIG. 3 illustrates an embodiment of contents navigation information in accordance with the present invention.

As shown in FIG. 3, the ENAV unit information includes file names of data files included in the associated ENAV unit (File(s) Name), addresses of the data files in the contents providing server 300 (File(s) Address), the presentation time of the associated ENAV unit (ENAV_Unit_Presentation_Time), and the total size of data files included in the next ENAV unit (Next_ENAV_Unit_Total File(s) Size).

The microcomputer 13 controls the DVD engine and the ENAV engine included in the IDVD system 12 using the ENAV unit information of the linked list provided by the contents providing server 300.

The microcomputer 13 correlates chapters of the A/V data stream reproduced by the DVD engine with data files reproduced by the ENAV engine using the fields of 'File(s) Name' and 'File(s) Address' included in the ENAV unit information.

In addition, the microcomputer 13 estimates the total presentation time of the ENAV unit being reproduced and determines if the total size of data files of the next ENAV unit exceeds the size of the remaining space of the memory buffer 14 using the fields of 'ENAV_Unit_Presentation_Time' and 'Next_ENAV_Unit_Total File(s) Size' included in the ENAV unit information. If the presentation of the ENAV unit being reproduced requires quite a long time and the memory buffer 14 has no remaining space, the microcomputer 13 sends a command to the contents providing server 300 to delay the transmission of the next ENAV unit data files by the contents providing server 300 for a prescribed time, for example, ½ of the estimated total presentation time of the current ENAV unit.

If the total size of data files of the next ENAV unit exceeds the size of the remaining space of the memory buffer 14, the microcomputer 13 sends a command to the contents providing server 300 for requiring that the contents providing server 300 transmit the data files of the next ENAV unit sequentially by organizing them into several groups or compress the data files before transmission so that the total size of the compressed data files may become less than a prescribed limit.

If the data files are compressed to be transmitted, the microcomputer 13 may present a desired compression rate to the contents providing server 300. For example, if the data files of the next ENAV unit need to be compressed by more than 30% to be stored in the memory buffer 14, the microcomputer 13 sends a desired compression rate of 30% to the contents providing server 300. If the compression rate is achievable, the contents providing sever 300 provides the data files after compression. Otherwise, the contents providing server 300 organizes the data files of the next ENAV unit into several groups and provides the groups sequentially.

By the aforementioned procedure, the interactive optical disk reproducing apparatus 100 can reproduce A/V data from the I-DVD 10 in conjunction with the ENAV contents data provided by the contents providing server 300.

One ENAV unit may correspond to more than one chapter and one chapter may correspond to more than one ENAV unit. The linked list may include other navigation information as well as the ENAV unit information and may be defined as other names such as ENAV playlist.

The method for reproducing data recorded on an interactive recording medium in conjunction with associated auxiliary data in accordance with the present invention allows synchronized reproduction of data from different sources in an interactive optical disk reproducing apparatus.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method for reproducing additional data associated with Audio/Video data (AV data), the method performed by at least one device and comprising:
   retrieving the AV data;
   obtaining listing information including a list of navigation information;
   obtaining the navigation information corresponding to the AV data using the listing information, wherein the navigation information includes identification information, location information, time information, and size information used for processing the additional data;
   receiving the additional data which corresponds to the AV data from an external server using the identification information and the location information, wherein the identification information is an identifier assigned to the additional data, and the location information indicates where the additional data is located, and wherein a single additional data is associated with plural AV data or plural additional data are associated with a single AV data;
   transmitting the additional data to a decoding unit of the at least one device through a buffer of the at least one device, using the size information,
   wherein the time information is associated with synchronization of the AV data and the additional data;
   wherein the size information of the buffer used for transmitting the additional data to a decoding unit of the at least one device indicates a buffer size needed for storing the additional data in the buffer;
   decoding, by the decoding unit, the additional data synchronously with the AV data; and
   displaying the AV data with the decoded additional data.

2. The method of claim 1, wherein the additional data is received through an Internet interface of the at least one device.

3. The method of claim 1, wherein the AV data is retrieved from a storage medium.

4. An apparatus for reproducing audio/video data (AV data) and additional data associated with the AV data, the apparatus comprising:
   a buffer;
   a decoding unit;
   a controller configured to:
   obtain listing information including a list of navigation information,
   obtain the navigation information corresponding to the AV data using the listing information, wherein the navigation information includes identification information, location information, time information, and size information used for processing the additional data,
   receive the additional data which corresponds to the AV data from an external server using the identification information and the location information, wherein the identification information is an identifier assigned to the additional data, and the location information indicates where the additional data is located, and wherein a single additional data is associated with plural AV data or plural additional data are associated with a single AV data, transmit the additional data to the decoding unit through the buffer, using the size information, wherein the time information is associated with synchronization of the AV data and the additional data, wherein the size information of the buffer used for transmitting the additional data to a decoding unit of the at least one device indicates a buffer size needed for storing the additional data in the buffer, control the decoding unit to decode the additional data synchronously with the AV data; and a display unit configured to display the AV data with the decoded additional data.

5. The apparatus of claim 4, wherein the additional data is received through an Internet interface of the at least one device.

6. The apparatus of claim 4, wherein the AV data is retrieved from a storage medium.

* * * * *